(12) United States Patent
Apostolopoulos et al.

(10) Patent No.: US 8,692,865 B2
(45) Date of Patent: Apr. 8, 2014

(54) REDUCING VIDEO CROSS-TALK IN A VISUAL-COLLABORATIVE SYSTEM

(75) Inventors: John G. Apostolopoulos, Palo Alto, CA (US); Ramin Samadani, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 803 days.

(21) Appl. No.: 12/883,159

(22) Filed: Sep. 15, 2010

(65) Prior Publication Data
US 2012/0062449 A1   Mar. 15, 2012

(51) Int. Cl.
H04N 7/14 (2006.01)
G06F 3/00 (2006.01)

(52) U.S. Cl.
USPC ........................................ 348/14.12; 715/733

(58) Field of Classification Search
USPC ................... 348/43, 536, 51, 201, 14.08, 140
See application file for complete search history.

(56) References Cited

U.S. PATENT DOCUMENTS

| | | | |
|---|---|---|---|
| 4,885,638 A * | 12/1989 | Bennett | 348/536 |
| 4,959,718 A * | 9/1990 | Bennett | 348/536 |
| 5,400,069 A | 3/1995 | Braun et al. | |
| 6,554,433 B1 | 4/2003 | Holler | |
| 7,599,561 B2 | 10/2009 | Wilson et al. | |
| 7,690,795 B2 | 4/2010 | Cole et al. | |
| 2004/0143421 A1 | 7/2004 | Wang et al. | |
| 2007/0052801 A1* | 3/2007 | Shimamura | 348/140 |
| 2009/0278913 A1 | 11/2009 | Rosenfeld et al. | |
| 2010/0033555 A1* | 2/2010 | Nagase et al. | 348/43 |
| 2010/0238274 A1* | 9/2010 | Kim et al. | 348/51 |
| 2011/0298933 A1 | 12/2011 | Yanowitz et al. | |

OTHER PUBLICATIONS

Sanchez, J. A., et al., "Enhancing Interaction and Collaboration in Multimedia Rooms with Multilayered Annotations and Telepointers". *ACM International Conference Proceeding Series;* vol. 378, *Proceedings of the VIII Brazilian Symposium on Human Factors in Computing Systems,* (2008), 117-125

Lincoln, Peter et al., "Multi-View Lenticular Display for Group Teleconferencing", *Immerscom 2009*, (May 27-29, 2009).

(2008), Bimber, Oliver et al., "The Visual Computing of Projector-Camera Systems", *International Conference on Computer Graphics and Interactive Techniques*, (2008).

* cited by examiner

*Primary Examiner* — Mohammad Islam

(57) ABSTRACT

A visual-collaborative system including a display screen configured to display images and a camera configured to capture images. The system also includes a video cross-talk reducer configured to estimate video cross-talk that is to be displayed on the display screen and captured by the camera, and reducing the estimated video cross-talk from captured images by the camera. The estimation of the video cross-talk and reduction of the video cross-talk is signal based.

13 Claims, 5 Drawing Sheets

400

```
┌─────────────────────────────────────────────────────────┐
│ estimate video cross-talk to be displayed on a display  │
│ screen and captured by a camera, wherein the display    │
│ screen is configured to display images and the camera   │
│ is configured to capture images                         │
│                         410                             │
│   ┌─────────────────────────────────────────────────┐   │
│   │ estimate video cross-talk to be displayed on a  │   │
│   │ whiteboard and captured by a camera             │   │
│   │                     415                         │   │
│   └─────────────────────────────────────────────────┘   │
└─────────────────────────────────────────────────────────┘
                            │
                            ▼
┌─────────────────────────────────────────────────────────┐
│ reduce the estimated video cross-talk from images       │
│ captured by the camera, wherein the estimation of said  │
│ video cross-talk is signal based                        │
│                         420                             │
│   ┌─────────────────────────────────────────────────┐   │
│   │ correct color of said images captured by said   │   │
│   │ camera                                          │   │
│   │                     421                         │   │
│   └─────────────────────────────────────────────────┘   │
│   ┌─────────────────────────────────────────────────┐   │
│   │ geometrically correct the images captured by    │   │
│   │ the camera                                      │   │
│   │                     422                         │   │
│   └─────────────────────────────────────────────────┘   │
│   ┌─────────────────────────────────────────────────┐   │
│   │ correct spatially-varying black-level offset    │   │
│   │ and gain of the images captured by said camera  │   │
│   │                     423                         │   │
│   └─────────────────────────────────────────────────┘   │
│   ┌─────────────────────────────────────────────────┐   │
│   │ correct space-varying blur of the images        │   │
│   │ captured by the camera                          │   │
│   │                     424                         │   │
│   └─────────────────────────────────────────────────┘   │
└─────────────────────────────────────────────────────────┘
```

FIG. 4

REDUCING VIDEO CROSS-TALK IN A VISUAL-COLLABORATIVE SYSTEM

CROSS-REFERENCE TO RELATED U.S. APPLICATIONS

This application is related to U.S. patent application Ser. No. 12/883,150, entitled "Determining A Synchronization Relationship," by Apostolopoulos et al., with filing date Sep. 15, 2010, and assigned to the assignee of the present invention and related to U.S. patent application Ser. No. 12/883,135, entitled "Estimating Video Cross-Talk," by Apostolopoulos et al., with filing date Sep. 15, 2010, and assigned to the assignee of the present invention.

BACKGROUND

Visual-collaborative systems provide a variety of benefits to users. Such benefits include natural interactivity between users, correct eye contact and gaze direction and media sharing, including gaze awareness (knowing where someone is looking) with respect to shared media. However, visual-collaborative systems are often afflicted by video cross-talk. Video cross-talk is when content displayed for viewing by a local user is also captured by a camera for delivery to a remote user.

Numerous attempts have been made to reduce video cross-talk, such as, various forms of multiplexing (e.g., temporal, wavelength (color), and polarization). However, these attempts often have performance and cost limitations.

BRIEF DESCRIPTION OF THE DRAWINGS

FIG. 4 illustrates an example of a flow chart of a method for reducing video cross-talk, in accordance with an embodiment of the present invention.

Figure 1A:
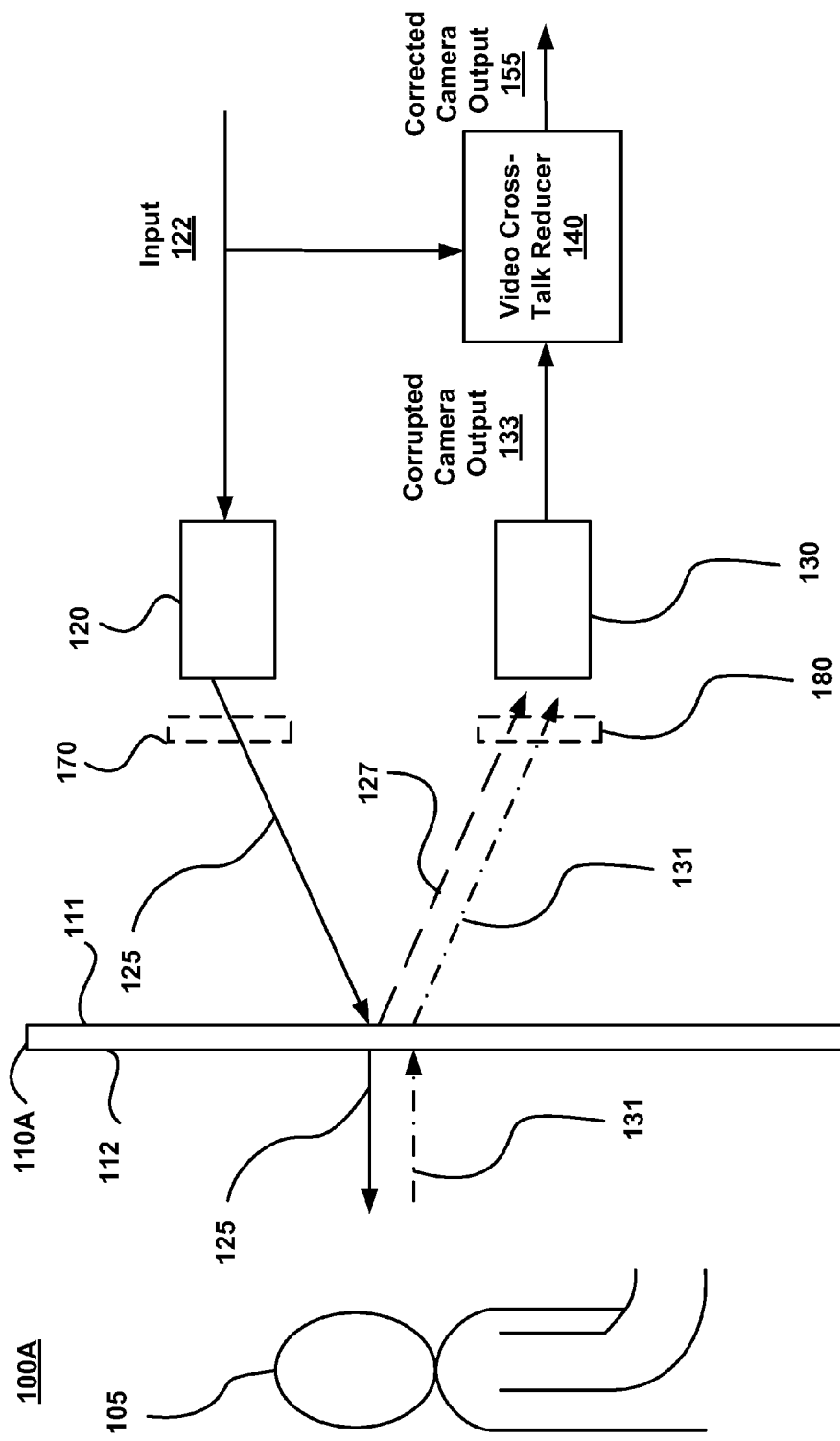
FIGS. 1A-B illustrate examples of a visual collaborative system, in accordance with embodiments of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Embodiments of the present invention are directed to visual-collaborative systems. Typically, visual-collaborative systems enable geographically distributed groups or individuals to engage in interactive collaborative video communication. These visual-collaborative systems attempt to recreate the best aspects of actual face-to-face communications. It should be appreciated that a visual-collaborative system includes: a camera disposed at any location that is capable of capturing images (e.g. images of a user and/or associated objects) to be transmitted to a corresponding remote visual-collaborative system and a display screen configured to display images captured at a remote location and transmitted to a local visual-collaborative system.

Specific examples will follow in which visual-collaborative systems include a camera that captures images through a display screen. It will be understood that other visual-collaborative systems can include cameras at any location (as described above). However, for the purposes of brevity and clarity, examples of visual-collaborative systems will be used that capture images through a display screen.

Similarly, specific examples will follow in which visual-collaborative systems include a projector that projects images onto a back side of a display screen. It will be understood that other visual-collaborative systems can include a projector on the front side (e.g., same side as the user). Moreover, visual-collaborative systems may not include a projector and images are displayed solely by a partially transmissive display, such as a partially transparent organic light emitting diode (OLED) display screen. However, for the purposes of brevity and clarity, examples of visual-collaborative systems will be used that project images onto and through a display screen.

A discussion regarding embodiments of a visual-collaborative system is provided below. First, the discussion will describe the structure or components of various embodiments of visual-collaborative systems. Then the discussion will describe the operational description of the visual-collaborative system.

FIG. 1A depicts an embodiment of visual-collaborative system 100A, in accordance to an embodiment of the present invention. Visual-collaborative system 100A includes display screen 110A, projector 120, camera 130 and video cross-talk reducer 140.

Projector 120 is configured to project images, via projected light 125, captured at a remote location onto display screen 110A. In one embodiment, input 122 is received by projector 120 and subsequently projected through projector 120 as images onto display screen 110A.

Camera 130 is configured to capture images for transmission to a remote location. For example, the captured images are transmitted to a corresponding visual-collaborative system at a remote location. It should be appreciated that a remote location can refer to a distant location, such as, another city. However, a remote location can also be a location within the same building, for example, an adjacent room or even different locations within the same room. In this later case, there may be two or more people within the same room who use two or more visual-collaborative systems to collaborate together. This may be for work or entertainment, e.g., computer games.

Display screen 110A is configured to display images captured at a remote location. In one embodiment, display screen 110A is a rear projection display screen comprising a holographic screen material that diffuses light striking a surface from specific angles corresponding to the projector direction.

Video cross-talk reducer 140 is configured to estimate video cross-talk that occurs on display screen 110A and captured by camera 130. Video cross-talk reducer 140 is also configured to reduce the estimated video cross-talk from captured images by camera 130, which will be described in detail below.

During use and operation of visual-collaborative system 100A, input 122 (e.g., video signal transmitted from a remote location) is received by projector 120. Projected light 125 is projected by projector 120 onto first side 111 of display screen 110A. For example, the video signal received from the remote location is projected onto display screen 110A. Projected light 125 is transmitted through display screen 110A and viewed by user 105 on second side 112 of display screen 110A.

Camera 130 captures light 131. In one embodiment, camera output 133 is captured images (e.g., video signals). For example, camera output 133 can be, but is not limited to, user 105, any markings on display screen 110A and/or any objects in the vicinity of user 105.

Camera 130 also captures backscattered light 127. Backscattered light 127 is reflected light of projected light 125 off of display screen 110A. As a result, video cross-talk is generated. As described above, video cross-talk is when back scattered light 127 is also captured by camera 130 for delivery to a remote user.

Camera 130 captures light 131 and backscattered light 127 and generates camera output 133.

In various embodiments, visual-collaborative system 100A employs optics and/or hardware to separate and remove the cross-talk signals. For example, visual-collaborative system 100A employs (1) time multiplexing, (2) polarization and (3) wavelength (color) division multiplexing.

In one embodiment, time multiplexing uses synchronized temporal multiplexing of video signals. In particular, projector 120 and camera 130 are synchronized such that when projector 120 projects light 125, camera 130 does not receive light 131 or 127. Similarly, when camera 130 receives light 131, projector 120 does not project light 125. As a result, camera 130 does not receive backscattered light 127 and video cross-talk is reduced. In one embodiment, time multiplexing is performed by generator lock (genlock) hardware.

However, this method is not incorporated with consumer-grade devices (e.g., off-the-shelf or legacy projectors and cameras). Even if professional-grade projectors and cameras provide the ability to be controlled by a synchronization signal, it would lead to very expensive hardware setups.

In various embodiments, visual-collaborative system 100A includes filters 170 and 180 to reduce video cross-talk. In one embodiment, filters 170 and 180 are orthogonal polarizing filters. For example, filter 170 filters out horizontally propagating light and filter 180 filters out vertically propagating light, or vice versa. As a result, video cross-talk is reduced.

However, approximately one half of projected light 125 is filtered out and not projected on display screen 110A. Similarly, approximately one half of light 131 is filtered out and not received by camera 130. Other problems also occur, such as, it is very difficult to get perfect polarization-based alignment, and there is generally some amount of light leakage which results in cross talk. Accordingly, performance of visual-collaborative system 100A is diminished.

In another embodiment, filters 170 and 180 are multiple pass band optical filters that separate the video signals by their light wavelength. For example, filter 170 filters out the lower half of the color spectrum and filter 180 filters out the upper half of the color spectrum, or vice versa. As a result, video cross-talk is reduced.

However, similar to the polarizing filters, approximately one half of projected light 125 is filtered out and not projected on display screen 110A. Similarly, approximately one half of light 131 is filtered out and not received by camera 130. Accordingly, performance of visual-collaborative system 100A is diminished.

In one embodiment, video cross-talk reducer 140 is configured to reduce video cross-talk without requiring optical hardware and/or synchronization hardware methods. For example, video cross-talk reducer 140 is able to reduce video cross-talk based on signals rather than using hardware optical elements (e.g., polarization and wavelength multiplexing) and synchronization (e.g., genlock) hardware. In another embodiment, video cross-talk is reduced by the combination of (1) video cross-talk reducer 140 and (2) optical hardware and/or synchronization hardware methods.

It should be appreciated that projector 120 and camera 130 may be simple off-the-shelf or legacy play back and image capture devices. Moreover, projector 120 and camera 130 do not require any revision of hardware and/or software in order to facilitate in video cross-talk reduction as described herein.

In general, video cross-talk reducer 140 is able to reduce video cross-talk by forward modeling input 122 propagating through visual-collaborative system 100A. For example, video cross-talk reducer 140 forward models (e.g., estimates) how input 122 is propagated through projector 120 and captured as video cross-talk at camera 130. Once video cross-talk is properly forward modeled, it is then reduced (e.g., subtracted) from the actual video cross-talk captured at camera 130. Then corrected camera output 155 is generated and subsequently transmitted to a remote location.

In particular, the following is accounted for to properly forward model the video cross-talk: (1) mapping from digital input (e.g., input 122) to projector 120 to projected light 125; (2) mapping from projected light 125 through visual-collaborative system 100A to light 127 hitting a camera sensor (accounting for color correction, grayscale correction, geometric correction, spatially-varying black-level offset and gain; and spatial-varying blur); and (3) mapping from light received (e.g., light 131 and back scattered light 127) by camera 130 to camera output 133.

In one embodiment, the forward model is implemented as a closed loop model that maps directly from projector digital input to camera digital output.

In one embodiment, shown in FIG. 1A, video cross-talk reducer 140 is able to reduce video cross-talk based on signals because of the following principles regarding light. The linearity of light means that the radiance emerging from first surface 111 (e.g., the back of the display screen 110A) is, $$s(x,y,t)=s_p(x,y,t)+s_d(x,y,t), \quad (1)$$

where continuous signal s(x, y, t) represents radiance, composed of two terms: (1) $s_p$(x, y, t) (e.g., back scattered light 127) from the video of the remote participant displayed by projector 120, and resulting in the cross-talk signal in camera 130, and (2) from the desired light $s_d$(x, y, t) (e.g., light 131) coming from a room, containing user 105 on side 112 of display screen 110A. In one embodiment, at camera 130, because of polarizing filters 170 and 180, the two signals are attenuated differently, but linearity continues to hold if camera 130 is controlled and its linearity enforced by setting the camera gamma to the identity.

The resulting video frames at camera 130 are given by, $$c(n_1,n_2,k)=c_p(n_1,n_2,k)+c_d(n_1,n_2,k), \quad (2)$$

where the functions c( ) $c_p$( ) and $c_d$( ) are 3-color functions of discrete spatial indices $n_1$ and $n_2$ and discrete temporal index k (color index not indicated for simplicity).

The inputs to video cross-talk reducer 140 are the corrupted signal $c(n_1, n_2, k)$ (e.g., camera output 133) and a short sequence of frames $p(m_1, m_2, l)$ for $l \in [l_{min}(k), l_{max}(k)]$ (e.g., input 122). The output (e.g., corrected camera output 155) is an estimate of the desired $c_d(n_1, n_2, k)$.

Linearity allows the solving of the signal subtraction problem for any arbitrary interfering cross-talk signal. In one embodiment, the entire view of camera 130 contains a desired signal as well as cross-talk and it is not possible to segment the cross-talk artifacts for removal.

In one embodiment, the transformation (forward model f( )) is estimated from projector signals $p(m_1, m_2, l)$ to camera cross-talk signal $c_p(n_1, n_2, k)$ to subtract the estimated signal $\hat{c}_p(n_1, n_2, k) = f(p(m_1, m_2, l))$ from Equation 2. In another embodiment, forward model f( ) is a transformation from a single projector frame (e.g., input 122) to camera output 133.

To obtain desired video cross-talk reduction, photometric, geometric and optical factors that comprise f( ) are characterized. In addition to forward modeling, video cross-talk reduction (e.g., subtraction) is desired to provide the cross-talk reduced signals to the remote participants.

In contrast, conventional technology in projector-camera modeling has developed inverse models to modify multiple projector input signals to result in uniform and well-blended signals on a screen. The camera is used incidentally to characterize the inverse model but the camera is not used during operation.

Figure 1B:
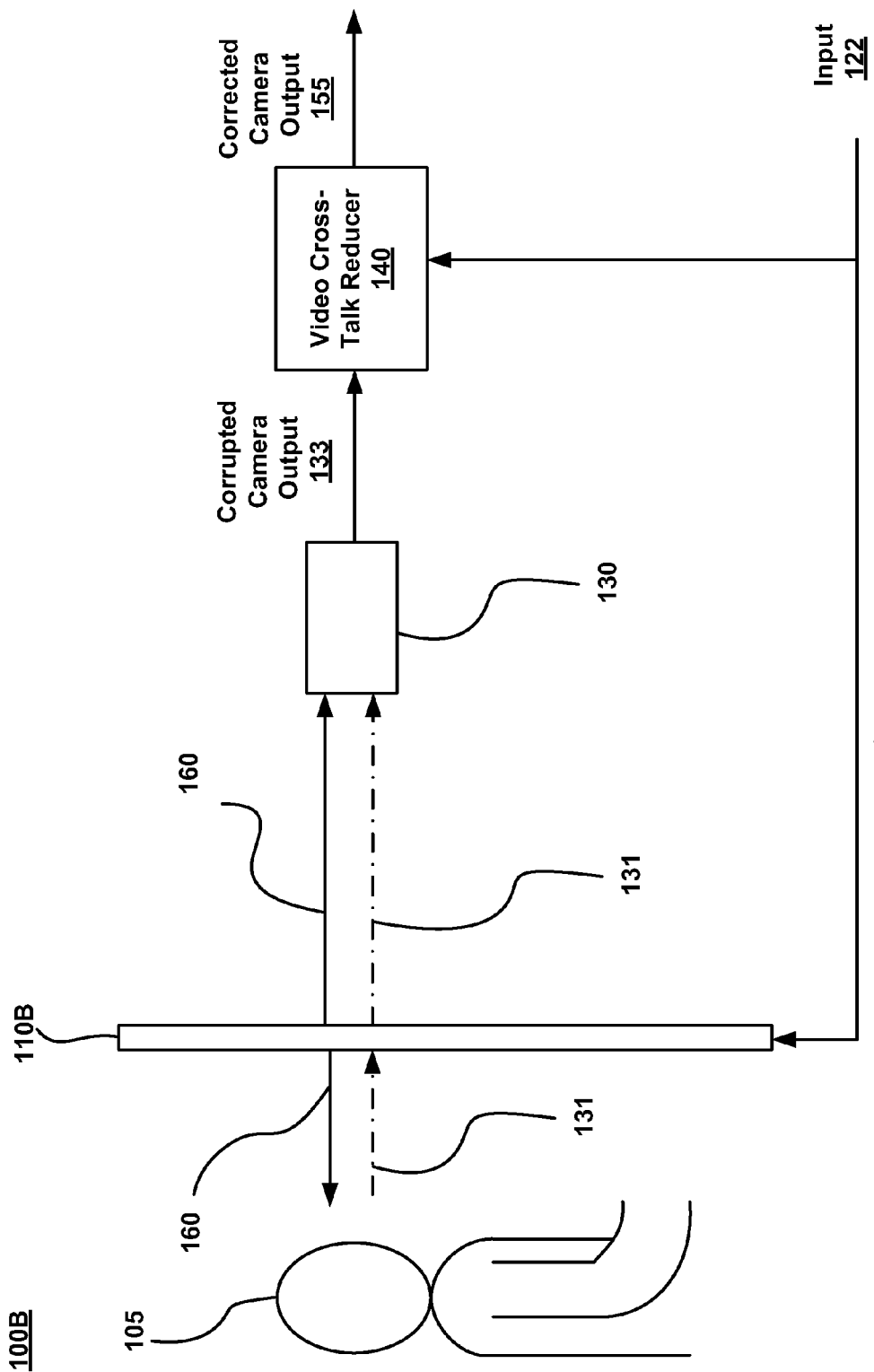

FIG. 1B depicts an embodiment of visual collaborative system 100B. Visual collaborative system 100B operates similarly to visual collaborative system 100A, however, visual collaborative system 100B includes display screen 100B. Unlike display screen 110A, display screen 110B does not require a projector for images to be displayed to user 105. This display screen can directly display content on the screen. This display screen also has the ability to be partially transmissive. For example, this may be a partially transparent organic light emitting diode (OLED) display screen.

During use and operation of visual-collaborative system 100B, camera 130 captures light 131 and light 160 that is displayed on display screen 110B. As a result of capturing light 131 and light 160 that is displayed on partially transparent display screen 110B, video cross-talk is generated.

In general, video cross-talk reducer 140 is able to reduce video cross-talk by forward modeling input 122 propagating through visual-collaborative system 100B. For example, video cross-talk reducer 140 forward models (e.g., estimates) how input 122 is propagated through partially transparent display screen 110B and captured as video cross-talk at camera 130. Once video cross-talk is properly forward modeled, it is then reduced (e.g., subtracted) from the actual video cross-talk captured at camera 130. Then corrected camera output 155 is generated and subsequently transmitted to a remote location.

Figure 2:
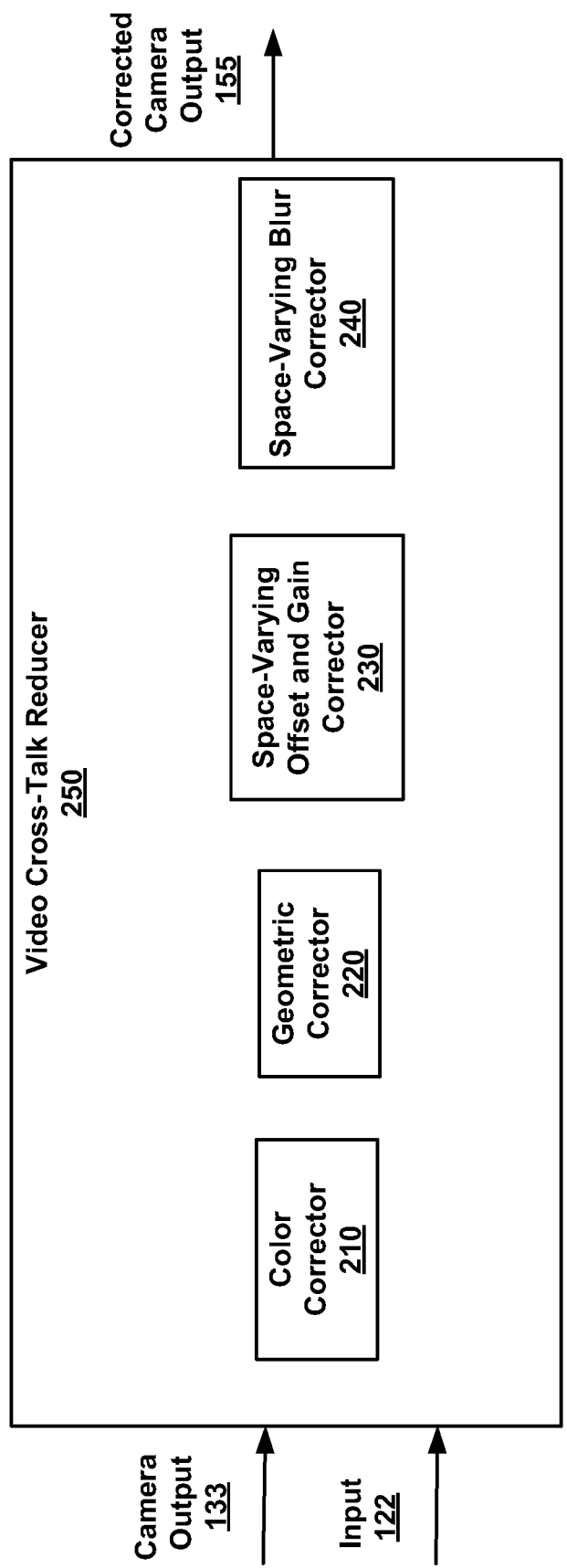
FIG. 2 illustrates an example of a video cross-talk reducer, in accordance with an embodiment of the present invention.

FIG. 2 depicts video cross-talk reducer 250 in accordance to an embodiment of the present invention. Video cross-talk reducer 250 forward models (e.g., estimates) how input 122 is propagated through projector 120 and captured as video cross-talk at camera 130. Once video cross-talk is properly forward modeled, it is then reduced (e.g., subtracted) from the actual video cross-talk captured at camera 130, as presented above. In one embodiment, video cross-talk reducer 250 uses static (time-invariant) characterizations of: 1) color transformation; 2) geometric transformation; 3) space-varying color gain and offset, and 4) space-varying blur. In a more general case, the characterization may be performed periodically, or continuously, depending on the time-varying nature of the characteristics.

In particular, video cross-talk reducer 250 includes color corrector 210, geometric corrector 220, space-varying offset and gain corrector 230 and space-varying corrector 240 to estimate the different parameters of f( ). In various embodiments, video tests are sent to projector 120 to estimate the different parameters of f( ). In one such embodiment, the test patterns include, but are not limited to, color patches, grid patterns, horizontal and vertical stripes, and uniform white, black and gray level signals. In another such embodiment, the video test patterns are sent while the room is dark. This calibration may also be performed during manufacture and before shipping.

Space-varying offset and gain corrector 240 is configured to account for and correct space-varying black level and space-varying brightness. For example, by averaging captured uniform white video frames and black video frames, (spatially-varying) white response, $W(n_1, n_2)$, and the black response, $B(n_1, n_2)$, of visual-collaborative system 100A is determined. For input $c_1(n_1, n_2, k)$, (normalized to be in the range [0,1]) the output is given by, $$c_O(n_1, n_2, k) = c_1(n_1, n_2, k)[W(n_1, n_2) - B(n_1, n_2)] + B(n_1, n_2). \quad (3)$$

Color corrector 210 is configured to provide color transformation. For example, in one embodiment, given the gain offset transformation (as described above), a global color transformation is determined by fitting between measured colors and color values $c_1$( ) generated using the inverse of Equation 3.

Measured average color values for gray input patches are used to determine 1D lookup tables applied to the input color components, and measured average color values for primary R, G, B inputs are used to determine a color mixing matrix using the known digital input color values. Determining the fits using the spatially renormalized colors allows the color model to fit the data with a small number of parameters.

Geometric corrector 220 is configured to provide geometric transformation. In one embodiment, geometric transformation is determined using a traditional multidimensional polynomial transformation model.

Space-varying blur corrector 240 is configured to account for and correct space-varying blur. In one embodiment, space-varying blur corrector 240 is utilized to obtain good results at edges in the cross-talk signal. If space-varying blur 240 is not utilized, objectionable halo artifacts remain visible in corrected camera output 155.

The parameters of the space-varying blur are determined by estimating separable blur kernels in the horizontal and vertical directions. Captured horizontal and vertical step edges at different locations in the frames are fit using scaled erf error functions. The standard deviations σ of best fit are also the parameters for the space-varying Gaussian blurs that are applied. In one embodiment, the range of values found are $\sigma \in [1, 4]$. In another embodiment, the sparsely sampled blur estimates, 50 points each for horizontal and vertical estimates, are interpolated to a spatially dense set of horizontal and vertical blur parameters, $\sigma_h(n_1, n_2)$ and $\sigma_v(n_1, n_2)$.

Direct implementation of space-varying blur, $$c_b(n_1, n_2) = \sum_{n'_1, n'_2} G(n_1, n_2, n'_1, n'_2) c_u(n'_1, n'_2) \quad (4)$$

can be expensive. Accordingly, methods have been modified (to provide unity gain filters) where space-varying Gaussian filters of arbitrary width are approximated by a linear combination of space invariant Gaussian filters of predetermined width.

Thus, the linear (but shift variant) operation of Equation 4 is approximated by, $$c_b(n_1, n_2) \approx \sum_i \alpha_i(n_1, n_2) \sum_{n'_1, n'_2} G_i(n_1 - n'_1, n_2 - n'_2) c_u(n'_1, n'_2). \quad (5)$$

In one embodiment, i=4, so that four separable convolutions are followed by pixel-wise linear combination with weights $\alpha_1(n_1, n_2)$ that are predetermined for efficiency.

Figure 3:
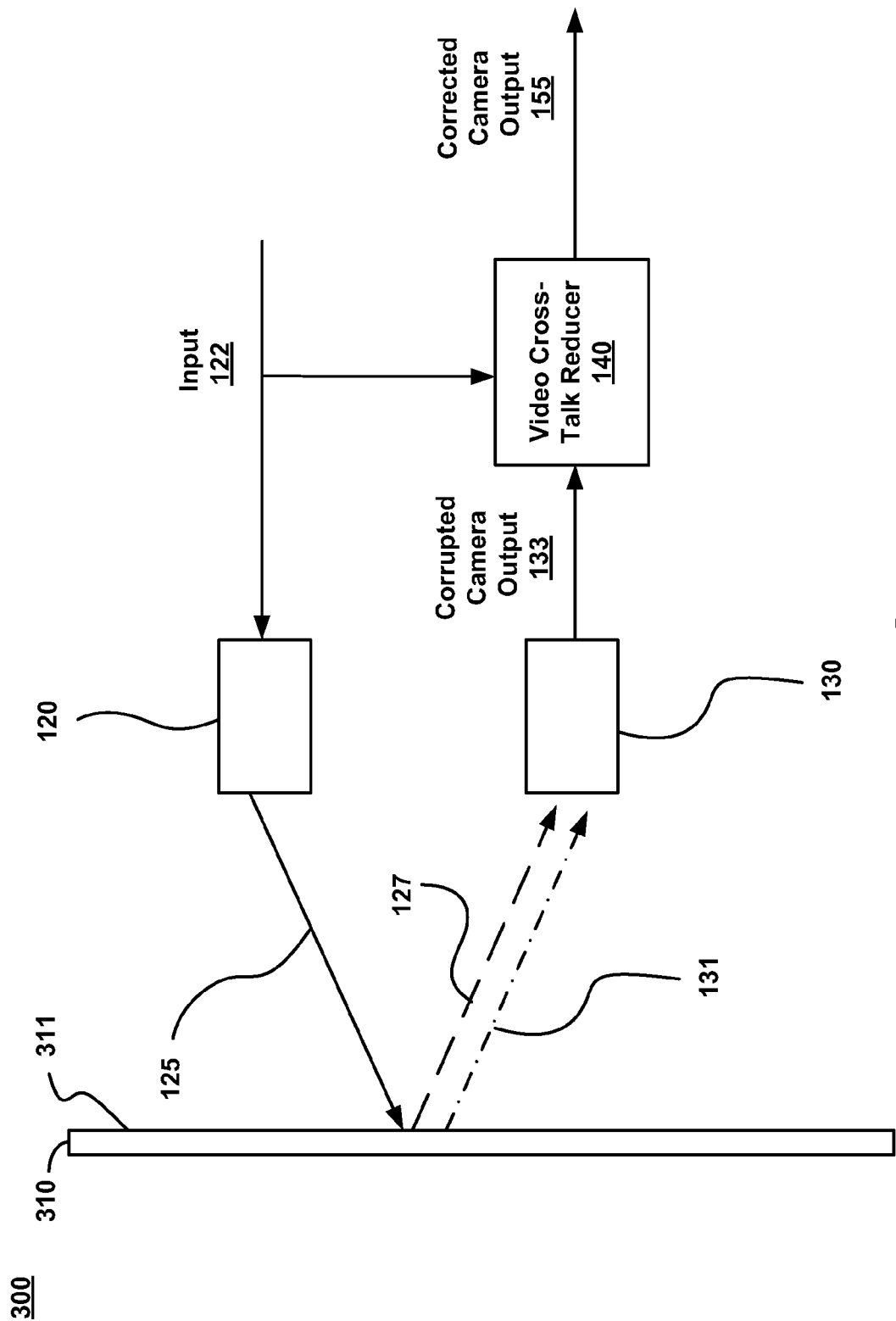
FIG. 3 illustrates an example of a visual collaborative system, in accordance with an embodiment of the present invention.

FIG. 3 depicts an embodiment of visual-collaborative system 300, in accordance to an embodiment of the present invention. Visual-collaborative system 300 operates similarly to visual-collaborative system 100A, however, visual-collaborative system 300 includes a whiteboard 310 (e.g. non-transparent display screen) rather than a see-through display screen 110A.

Accordingly, during use, projector 120 project light 125 onto the front side 311 of whiteboard 310. Camera 130 captures light 131 (e.g., written text on whiteboard 310) and backscattered light 127 (e.g., reflectance of whiteboard 310) and generates camera output 133.

As described above, in various embodiments, video cross-talk reducer 250 (or 150) generates corrected camera output 155 by reducing an estimated video cross-talk from camera output 133. For example, the additive model of the portions of projected light of the remote scene and the light from the locally captured scene shown in the embodiment of FIG. 3 can be described as:

$$c(x,t) = p(x,t) + l(x,t), \quad (6)$$

where c(x,t) is the camera signal, p(x,t) is portion of light projected by the projector and l(x,t) is the portion of light due to the local scene (e.g., light reflected from user). After a forward model of p(x,t) is determined, it is reduced or subtracted out of c(x,t).

In another embodiment, video cross-talk reducer 250 generates corrected camera output 155 by reducing an estimated video cross-talk generated from projector 120 projecting light 125 onto whiteboard 310. Accordingly, an "idealized" model of the projected light and light of the whiteboard writing is:

$$c(x,t) = p(x,t) w(x,t), \quad (7)$$

where c(x,t) is the camera signal, p(x,t) is portion of light projected by the projector and w(x,t) is the reflectance of the white board, including written text on the white board, for example. In other words, camera signal c(x,t) is light of the projector p(x,t) multiplied by the reflectance of the whiteboard w(x,t). After a forward model of p(x,t) is determined, it is reduced or subtracted out of c(x,t).

In another embodiment, video cross-talk reducer 250 generates corrected camera output 155 by reducing an estimated video cross-talk generated from projector 120 projecting light 125 onto whiteboard 310 in a dark room. Accordingly, an "idealized" model of the projected light and light of the whiteboard writing is:

$$\log c(x,t) = \log p(x,t) + \log w(x,t), \quad (8)$$

where c(x,t) is the camera signal, p(x,t) is portion of light projected by the projector and w(x,t) is the white board writing. After a forward model of log p(x,t) is determined, it is reduced or subtracted out of log c(x,t).

In a further embodiment, video cross-talk reducer 250 generates corrected camera output 155 by reducing an estimated video cross-talk generated from projector 120 projecting light 125 onto whiteboard 310 in a room with ambient light that does not change. Accordingly, a model of the projected light and light of the whiteboard writing is:

$$c(x,t) = w(x,t)[p(x,t) + a(x)], \quad (9)$$

where c(x,t) is the camera signal, p(x,t) is portion of light projected by the projector, w(x,t) is the white board writing, and a(x) is ambient light. After a forward model of p(x,t) is determined, it is reduced or subtracted out of c(x,t).

In yet another embodiment, video cross-talk reducer 250 generates corrected camera output 155 by reducing an estimated video cross-talk generated from projector 120 projecting light 125 onto whiteboard 310 in a room with ambient light that does change. Accordingly, a model of the projected light and light of the whiteboard writing is:

$$c(x,t) = w(x,t)[p(x,t) + a(x,t)], \quad (10)$$

where c(x,t) is the camera signal, p(x,t) is portion of light projected by the projector, w(x,t) is the white board writing, and a(x,t) is changing ambient light. After a forward model of p(x,t) is determined, it is reduced or subtracted out of c(x,t).

FIG. 4 depicts a method 400 for reducing video cross-talk in a visual-collaborative system, in accordance with an embodiment of the present invention. In one embodiment, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 400 is performed at least by visual-collaborative systems 100A-B and 300 described in FIGS. 1A-B and 3, respectively.

At 410 of method 400, video cross-talk from display screen (e.g., display screen 110A or whiteboard 310) and captured by camera 130 is estimated. Display screen is configured to display images captured at a remote location and camera 130 is configured to capture images for transmission to the remote location. For example, the transformation (forward model f( )) is estimated from projector signals $p(m_1, m_2, l)$ to camera cross-talk signal $c_p(n_1, n_2, k)$.

In one embodiment, at 415, video cross-talk to be displayed on a whiteboard 310 and captured by camera 130 is estimated.

At 420 of method 400, the estimated video cross-talk from images captured by camera 130 is reduced, wherein the estimation of the video cross-talk and reduction in video-cross talk is signal based. For example, the estimated video-cross talk signal $\hat{c}_p(n_1, n_2, k) = f(p(m_1, m_2, l))$ is subtracted from Equation 2 to produce corrected camera output 155.

In one embodiment, at 421 of method 400, reduction of video cross-talk is facilitated by, correcting color of images captured by camera 120.

In a further embodiment, at 422 of method 400, reduction of video cross-talk is facilitated by, geometrically correcting the images captured by camera 120.

In another embodiment, at 423 of method 400, reduction of video cross-talk is facilitated by, correcting spatially-varying black-level offset and gain of the images captured by camera 120.

In yet another embodiment, at 424 of method 400, reduction of video cross-talk is facilitated by, correcting space-varying blur of the images captured by camera 120.

Various embodiments of the present invention are thus described. While the present invention has been described in particular embodiments, it should be appreciated that the present invention should not be construed as limited by such embodiments, but rather construed according to the following claims.

The invention claimed is:

1. A visual-collaborative system comprising:
   a display screen configured to display images;
   a camera configured to capture images; and
   a video cross-talk reducer configured to estimate video cross-talk from said display screen captured by said camera, and reducing said estimated video cross-talk from captured images by said camera, wherein said estimation of said video cross-talk and reduction of said video-cross talk is signal based;
   wherein said video cross-talk reducer comprises:
      a space-varying offset and gain corrector configured for spatially-varying black-level offset and gain correction of said estimated video cross-talk.

2. The visual-collaborative system of claim 1, wherein said video cross-talk reducer comprises:
   a color corrector configured for color and grayscale correction of said estimated video cross-talk.

3. The visual-collaborative system of claim 1, wherein said video cross-talk reducer comprises:
   a geometric corrector configured for geometric correction of said estimated video cross-talk.

4. The visual-collaborative system of claim 1, wherein said video cross-talk reducer comprises:
   a space-varying blur corrector configured for spatially-varying blur correction of said estimated video cross-talk.

5. The visual-collaborative system of claim 1, comprising:
   a projector configured to project said display images onto said display screen.

6. The visual-collaborative system of claim 1, comprising:
   a front projector configured to project said images onto said display screen, wherein said display screen is a whiteboard.

7. The visual-collaborative system of claim 1, wherein said display screen is a partially transparent display screen.

8. The visual-collaborative system of claim 7, wherein said partially transparent display screen is a partially transparent organic light emitting diode (OLED) display screen.

9. A computer-implemented method for reducing video cross-talk in a visual-collaborative system, said method comprising:
   estimating video cross-talk from a display screen captured by a camera, wherein said display screen is configured to display images and said camera is configured to capture images; and
   reducing said estimated video cross-talk from images captured by said camera, wherein said estimation of said video cross-talk and said reduction of said video cross-talk is signal based, wherein said reducing said estimated video cross-talk comprises correcting space-varying blur of said images captured by said camera.

10. The computer-implemented method of claim 9, wherein said reducing said estimated video cross-talk comprises:
    correcting color of said images captured by said camera.

11. The computer-implemented method of claim 9, wherein said reducing said estimated video cross-talk comprises:
    geometrically correcting said images captured by said camera.

12. The computer-implemented method of claim 9, wherein said reducing said estimated video cross-talk comprises:
    correcting spatially-varying black-level offset and gain of said images captured by said camera.

13. The computer-implemented method of claim 9, wherein said estimating video cross-talk from said display screen captured by a camera comprises:
    estimating video cross-talk from a whiteboard captured by said camera.

\* \* \* \* \*